(12) United States Patent
Dedden

(10) Patent No.: US 6,720,909 B1
(45) Date of Patent: Apr. 13, 2004

(54) RADAR APPARATUS

(75) Inventor: Gerrit Dedden, Ootmarsum (NL)

(73) Assignee: Thales Nederland B.V., Hengelo (NL)

( * ) Notice: Subject to any disclaimer, the term of this patent is extended or adjusted under 35 U.S.C. 154(b) by 0 days.

(21) Appl. No.: 10/009,779

(22) PCT Filed: Jun. 7, 2000

(86) PCT No.: PCT/EP00/05236

§ 371 (c)(1),
(2), (4) Date: Mar. 26, 2002

(87) PCT Pub. No.: WO00/79299

PCT Pub. Date: Dec. 28, 2000

(30) Foreign Application Priority Data

Jun. 17, 1999 (NL) .............................. 1012373

(51) Int. Cl.⁷ .............................................. G01S 13/30
(52) U.S. Cl. ........................ 342/137; 342/134; 342/135; 342/202
(58) Field of Search ................ 342/104, 110, 342/112, 115, 118, 134, 135, 137, 202

(56) References Cited

U.S. PATENT DOCUMENTS

| 4,125,835 A | * | 11/1978 | Barry ........................ 342/135 |
| 4,257,108 A |   | 3/1981  | Igel |
| 4,375,641 A | * | 3/1983  | Josefsson et al. ............. 342/88 |
| 5,124,710 A |   | 6/1992  | Debuisser |
| 5,442,359 A |   | 8/1995  | Rubin |
| 5,943,004 A | * | 8/1999  | Groenenboom et al. .... 342/137 |

FOREIGN PATENT DOCUMENTS

EP   0 336 273   10/1989

* cited by examiner

Primary Examiner—Ian J. Lobo
(74) Attorney, Agent, or Firm—Oblon, Spivak, McClelland, Maier & Neustadt, P.C.

(57) ABSTRACT

A radar apparatus provided with a transmitter for periodic transmission of mutually disjunct groups of N radar transmitter pulses and provided with a receiver for the receipt of echo signals of the groups of radar transmitter pulses. The radar apparatus includes a video processor for processing echoes in a listening time observed between two of the mutually disjunct groups of radar transmitter pulses. By choosing a suitable staggering of the pulses in a group, the target range and velocity may be unambiguously determined.

15 Claims, 5 Drawing Sheets

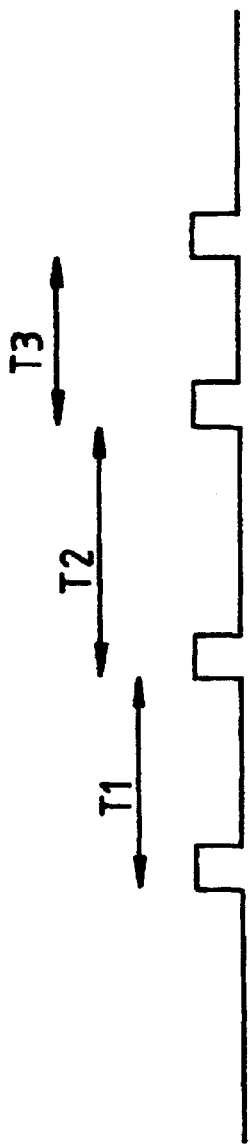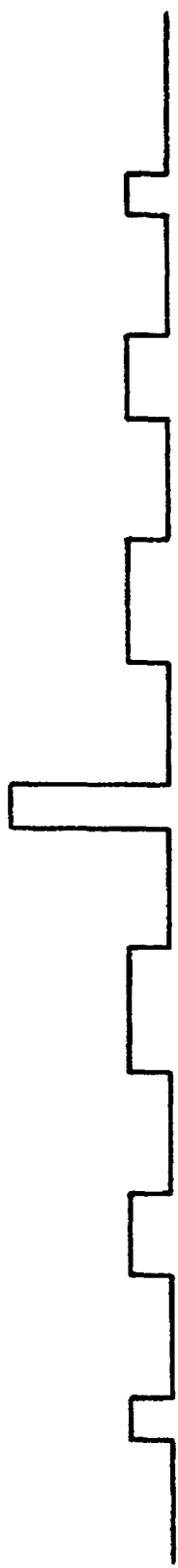

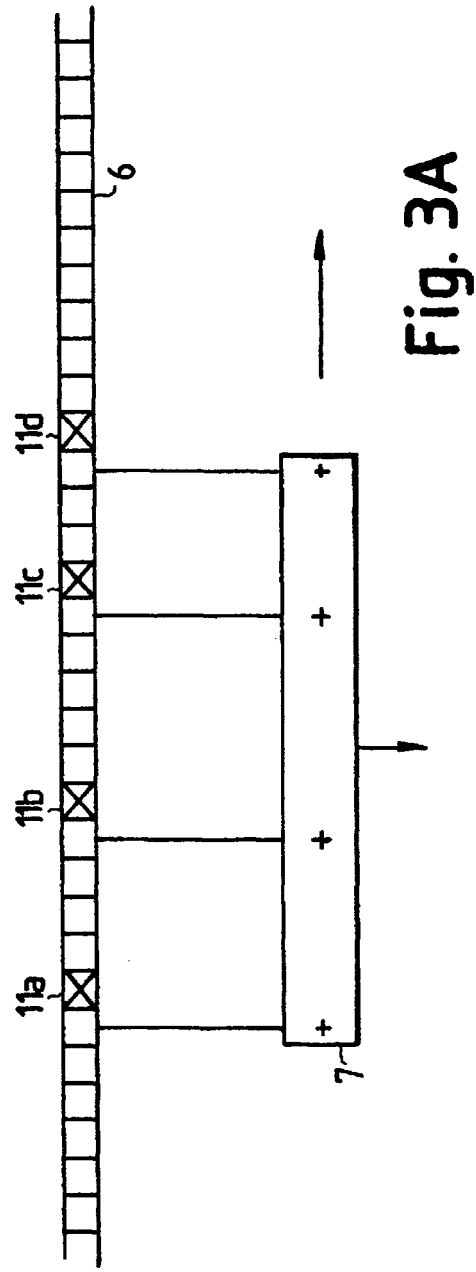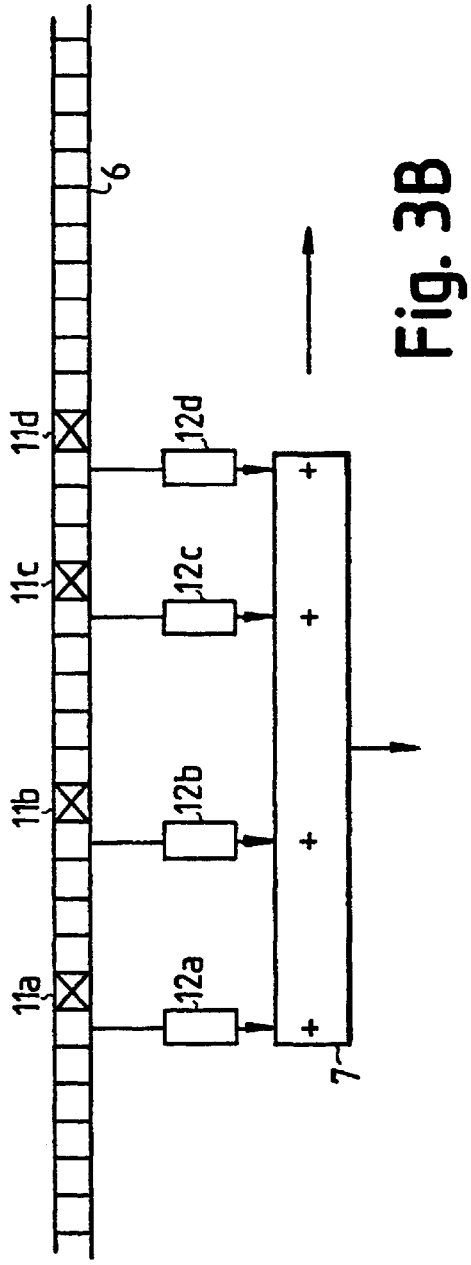

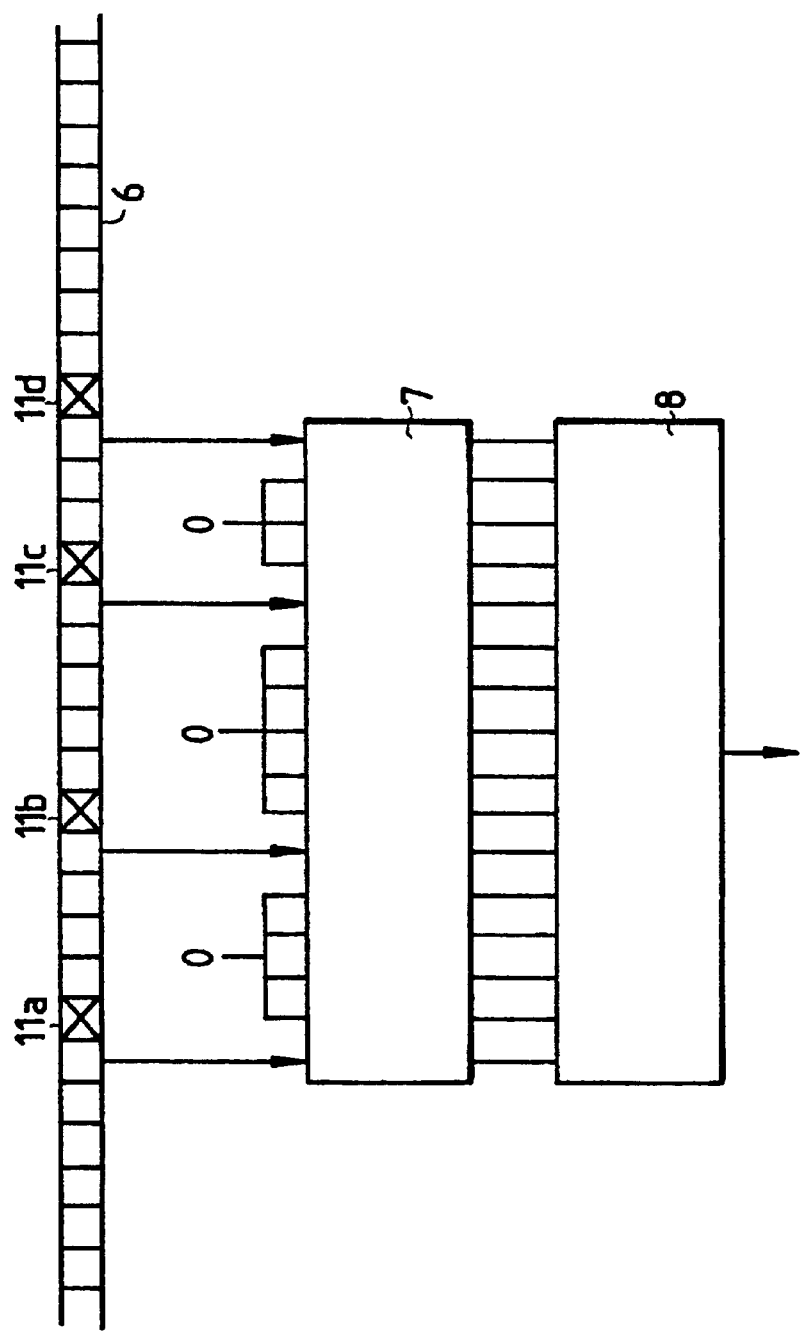

RADAR APPARATUS

The invention relates to a radar apparatus provided with a transmitter for the periodic transmission of mutually disjunct groups of N radar transmitter pulses, with N=4, 5, 6, . . . , a receiver for the receipt of echo signals of the radar transmitter pulses and a video processor for detecting possible objects on the basis of the received echoes and for estimating parameters of these objects.

Radar apparatus of this type are well-known in the art. The devices in question are radar apparatus in which a listening time is observed between two successive radar transmitter pulses to enable the receipt of echo signals. The drawback of these known radar apparatus is that, for distant targets, the interval between two pulses shall be chosen to be large which, however, would preclude the unambiguous determination of a target's radial velocity.

The inventive radar apparatus meets this drawback to a significant extent and is characterized, according to an aspect of the invention, in that the video processor is designed to process echoes in a listening time observed between two groups of radar transmitter pulses. For one target, N echoes are received on the basis of which both target range and radial velocity can be determined unambiguously.

A favourable embodiment of the radar apparatus according to the invention is characterized in that the video processor is provided with memory means for storing a row of complex video strengths determined by the receiver. This row can be searched for a pattern of echo signals that corresponds to the transmitted pattern. Besides, by considering the phase shift of the N echo signals, it is possible to determine the Doppler frequency and, thus, the radial velocity of the target associated with the echo signals.

A further favourable embodiment of the radar apparatus according to the invention is characterized in that the video processor is provided with a digital filter for processing a continuous subrow from the row of video strengths. This entails the advantage that the subrow may be considerably shorter than the row, which allows the use of a digital filter with a limited number of inputs. More precisely: the subrow shall be so long to enable the simultaneous processing of the N echo signals reflected by a point target. It will then suffice to pass the row of complex video strengths through the digital filter in order to obtain a substantially optimal detection.

A very favourable embodiment according to a further aspect of the invention is characterized in that the digital filter comprises a Fourier transformer or an equivalent linear transformer. Not only does this enable a substantially optimal detection but also renders it possible to simultaneously determine, on the basis of the phase shift of the N echo signals, the Doppler frequency and, thus, the radial velocity of a target.

A further favourable and simple embodiment of the radar apparatus according to the invention is characterized in that within a group, the pulses are mutually phase-coherent and a time interval between two pulses is always a multiple of a unit of time.

A favourable embodiment according to a further aspect of the invention is characterized in that the: transmitter is designed to position the pulses in a group in order of time in such a manner that for a point target the Fourier transformer delivers an output signal for at least substantially one subrow.

A favourable embodiment according to a further aspect of the invention is characterized in that out of all possible suitable pulse patterns, a pulse pattern is selected for which in case of a point target, the Fourier transformer delivers an output signal with minimum side lobes.

The invention furthermore relates to a method for operating a radar apparatus according to which groups of N radar transmitter pulses are periodically transmitted, with N=4, 5, 6, . . .

According to an aspect of the invention, the inventive method is characterized in that, in a listening time between two groups of radar transmitter pulses, the received radar echo signals are applied to a video processor to estimate parameters of a possible detected target.

A favourable realization of the inventive method is characterized in that the received radar echo signals are digitized and sequentially passed through a digital filter with at least N inputs for combining the N echo signals reflected by a target.

According to a further aspect of the invention, a favourable realization of the method is characterized in that within a group, the radar transmitter, pulses are transmitted non-equidistantly in time, in which case the radar transmitter pulses within a group are positioned such that at least for a point target, the digital filter delivers output signal at least substantially once.

A favourable realization of the method according to a further aspect of the invention is characterized in that the received radar echo signals are digitized and sequentially applied to a Fourier transformer with N inputs and M outputs, where M>>N. The velocity of a target can then be determined at the same time. The radar transmitter pulses within a group are preferably positioned such that at least for a point target, the Fourier transformer delivers an output signal with minimum side lobes.

A favourable realization according to a further aspect of the invention is characterized that for each transmitted group and each subrow a predetection is generated for at least the strongest output signal of the Fourier transformer or an equivalent transformer. A detection is generated if at least P practically identical predetections are generated for the same subrow from Q consecutively transmitted groups, with P=1, 2, . . . , Q=1, 2, and P$\leq$Q.

The invention will now be explained in greater detail with reference to the following figures, of which:

FIG. 2A represents a possible group of radar transmitter pulses according to the invention;

FIG. 2B represents an autocorrelation function for this group;

FIG. 3A represents a possible video processor for stationary targets;

FIG. 3B represents a possible video processor for targets of known velocity;

FIG. 4 represents a possible video processor for targets of random velocity;

Figure 1:
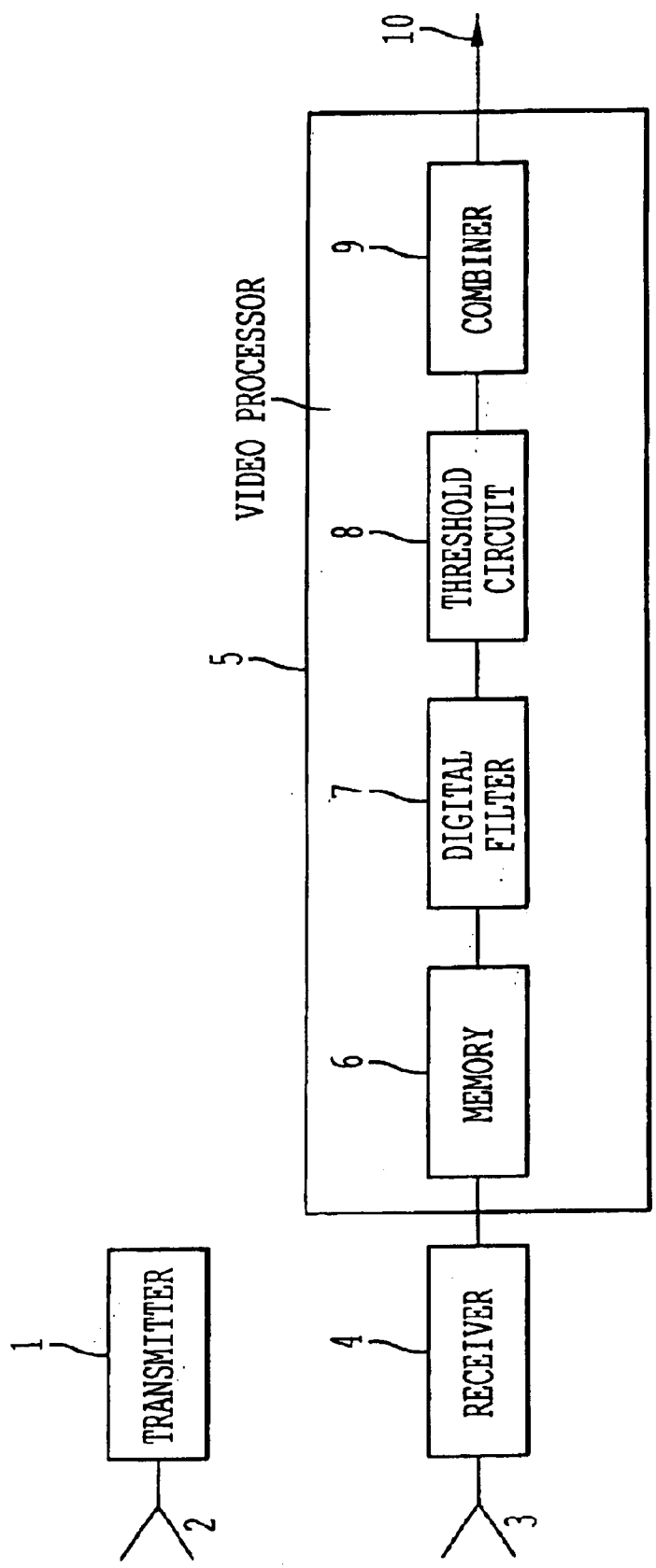
FIG. 1 represents a block diagram of the inventive radar apparatus.

FIG. 1 represents a block diagram of a possible embodiment of the inventive radar apparatus. A transmitter 1 generates groups of radar transmitter pulses that are transmitted via a transmitting antenna 2. Radar echo signals are received by a receiving antenna 3 and are processed in a receiver 4 to yield a complex digital video signal. Generally, it is also possible to use one combined transmitting/receiving antenna under the application of a T/R unit well-known in the art. The video signal produced by receiver 4 is applied to a video processor 5 where it is temporarily stored in memory means 6 to await further processing. The contents of memory means 6 is filtered by a digital filter 7 whose output is connected to a threshold circuit 8. In case of a crossing of a preestablished threshold, circuit 8 will generate a predetection, which possible predetections are combined in a combiner 9 for consecutively transmitted groups of radar transmitter pulses to yield a detection that is applied to an output 10 for further processing.

FIG. 2A represents a possible group of radar transmitter pulses according to the invention. The group shows several characteristic features. Firstly, the interval between two pulses is far shorter than the listening time of the radar apparatus; i.e. the time taken by a pulse to travel to a pulse a target and return. Secondly, the duration of a pulse is shorter than the interval between two pulses, in this case T1, T2, T3. Thirdly, the group is chosen such that the autocorrelation function of the group shows only one peak. According to the invention, the time intervals T1, T2, T3 are preferably chosen differently.

According to the invention, a group is transmitted and a target echo is processed for the entire group simultaneously. To this end, the target echo is applied to an autocorrelator, which presents the position of the target by a peak in the autocorrelation function.

FIG. 2B represents an autocorrelation function for the group shown in FIG. 2A. The position of the pulses has been carefully determined so that there is only one peak of height four, with all side lobes having height one. It will be evident that the number of groups possessing this feature is considerable, certainly if T1, T2, T3 can be chosen to be large. However, the group must not become too long, as this would cause the minimum range of the radar apparatus to become too large. The number of pulses to be contained in a group should remain within specified limits, as otherwise, the transmitter's maximum duty cycle would be exceeded.

In general, a radar apparatus does not emit four but about ten pulses. This entails the advantage that the main lobe/side lobe ratio of the autocorrelation function improves, which increases the detection probability.

FIG. 3A is a detailed representation of a possible digital filter 7 for stationary targets. The filter is applied to memory means 6, divided into range quants, that contains a row of complex video strengths as produced by the radar receiver. In case of only one target, the four memory cells 11a, 11b, 11c, 11d each contain a target strength higher than the noise level, originating from the four pulses transmitted in one single burst. Digital filter 7 is here implemented as an adder circuit which continuously adds target strengths from four memory means in accordance with the transmitted pattern. Owing to the characteristic feature of the transmitted group, only one output signal that represents the target range appears at the output of digital filter 7. In case of moving targets, the four target strengths show a varying phase which results in detection losses.

FIG. 3B represents a possible digital filter 7 for targets of known velocity, where digital filter 7 is provided with phase-shifting networks 12a, 12b, 12c, 12d. The networks 12a, 12b, 12c, 12d have been chosen such that for one selected velocity, based on the timing of the pulses within a group, the phase shift occurring as a result of target motion is compensated. This restores/reactivates the original autocorrelation function and elimates detection losses.

FIG. 4 represents a possible video processor for targets of random velocity. Digital filter 7 is implemented as a Fourier transformer which is applied to memory means 6. Because the group shown in this example has a length of 16 range quants, use is made of a 16-point Fourier transformer of which only the outputs 0, 5, 11 and 15 are connected to the corresponding range quants, which ensures an optimal summation of the received signal. The other inputs remain unused. Fully analogous to the correlator described with reference to FIG. 3A, the correlation signal in case of stationary targets appears at output 0 of the Fourier transformer. Echo signals of moving targets emerge at the other outputs of Fourier transformer 7 in order to allow the determination of target position and velocity.

According to the invention, the output signal of Fourier transformer 7 is fed to threshold circuit 8. In threshold circuit 8, a threshold value can in a manner known in the art be determined per range quant from the 16 input values; also, it can be verified whether one input value significantly exceeds the threshold, which would indicate the presence of a target in this range quant, after which a predetection can be generated. Subsequently, a detection probability and a false-alarm rate can in an obvious manner be established by a person skilled in the art.

It is also possible to generate detect ions without the introduction of a threshold value. This method is based on the assumption that in the presence of a target there is one maximum in the spectrum. In the unlikely event of two maxima occurring, one of these maxima is arbitrarily designated as the maximum. Per transmitted group, threshold circuit 8 remembers for each range quant which output of Fourier transformer 7 showed the highest value. Assuming that in the absence of a target there is no preference for a certain output, it can, for consecutively transmitted groups per range quant be verified in combiner 9, if a certain output is statistically significantly more often the highest. If such is should be the case, a detection is supplied to output 10.

The input values to Fourier transformer 7 are in fact unweighed, which may give rise to the occurrence of side lobes in the Doppler domain in the output signal. It is therefore recommendable to verify for the finite number of possible groups of pulses which group produces the smallest side lobes and subsequently to use this group.

Figure 5:
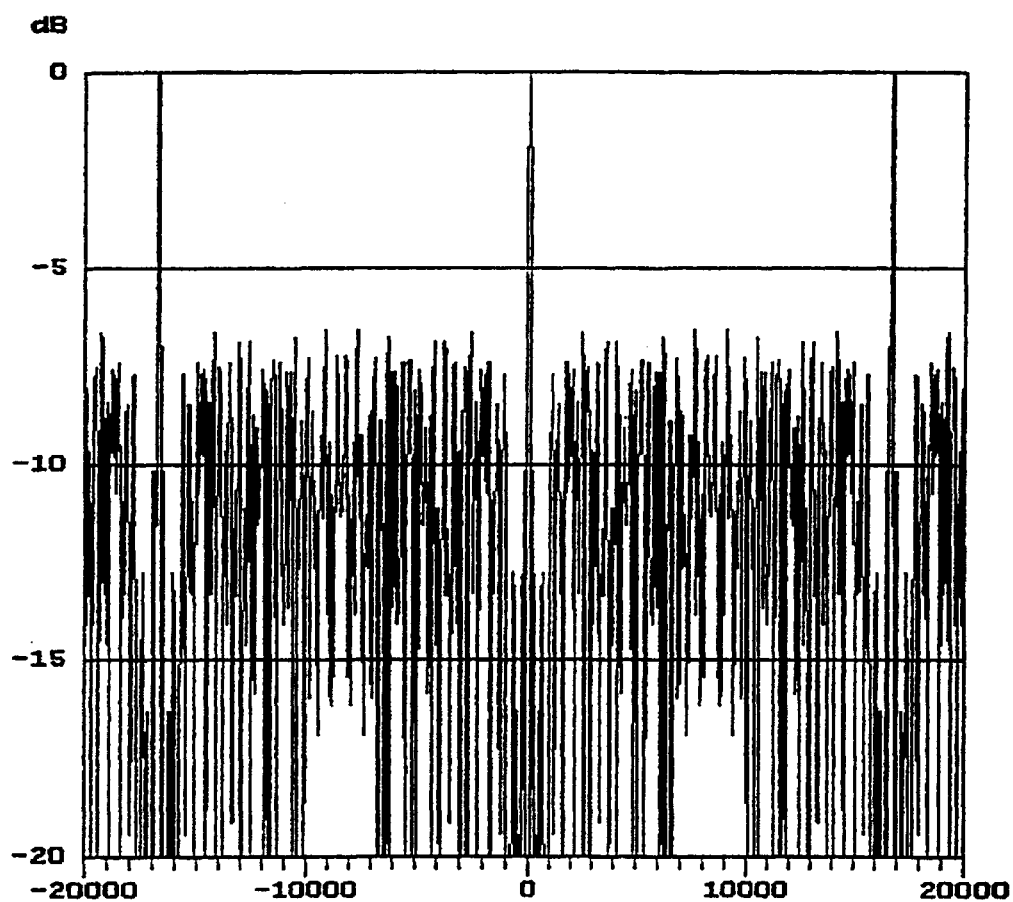
FIG. 5 represents a possible spectrum of a target.

FIG. 5 represents a possible spectrum of a target as it appears at the output of Fourier transformer 7. In this simulation, 11 pulses are transmitted at a radar frequency of 1400 Mc/s and a target is simulated at a velocity of 0 m/s. The horizontal scale is presented in m/s; the figure reveals the extremely high folding speed of 16000 m/s.

What is claimed is:

1. A radar apparatus comprising:
   a transmitter configured to periodically transmit mutually disjunct groups of N radar transmitter pulses, with N=4, 5, 6, . . . ;
   a receiver configured to receive echo signals of the radar transmitter pulses; and
   a video processor configured to detect possible objects based on the received echoes and to estimate parameters of the possible objects,
   wherein the video processor is configured to simultaneously process echoes from an entire group of said mutually disjunct groups in a listening time observed between two of the mutually disjunct groups of radar transmitter pulses.

2. The radar apparatus as claimed in claim 1, wherein the video processor includes a memory configured to store a row of complex video strengths determined by the receiver.

3. The radar apparatus as claimed in claim 2, wherein the video processor includes a digital filter configured to process a continuous subrow from the row of video strengths.

4. The radar apparatus as claimed in claim 3, wherein the digital filter comprises a Fourier transformer or an equivalent linear transformer.

5. The radar apparatus as claimed in claim 4, wherein within a group, pulses are mutually phase-coherent and a time interval between two pulses is always a multiple of a unit of time.

6. The radar apparatus as claimed in claim 5, wherein the transmitter is configured to position the pulses in a group in order of time such that for a point target the Fourier transformer delivers an output signal for at least substantially one subrow.

7. The radar apparatus as claimed in claim 6, wherein out of all possible suitable pulse patterns, a pulse pattern is selected for which in case of a point target, the Fourier transformer delivers an output signal with minimum side lobes.

8. A method for operating a radar apparatus comprising:
 transmitting periodically mutually disjunct groups of N radar transmitter pulses, with N=4, 5, 6, . . . ; and
 applying simultaneously received radar echo signals from an entire group of said mutually disjunct groups to a video processor to estimate parameters of a possible detected target during a listening time between two of the mutually disjunct groups of radar transmitter pulses.

9. The method as claimed in claim 8, further comprising:
 digitizing the received radar echo signals; and
 sequentially applying the digitized echo signals to a digital filter comprising at least N inputs.

10. The method as claimed in claim 9, further comprising transmitting the radar transmitter pulses non-equidistantly in time.

11. The method as claimed in claim 10, further comprising positioning the radar transmitter pulses within a group such that at least for a point target, the digital filter delivers an output signal at least substantially once.

12. The method as claimed in claim 11, further comprising:
 digitizing the received radar echo signals; and
 sequentially applying the digitized echo signals to a Fourier transformer with M inputs, where M>>N.

13. The method as claimed in claim 12, further comprising positioning the radar transmitter pulses within a group such that at least for a point target, the Fourier transformer delivers an output signal with minimum side lobes in the frequency domain.

14. The method as claimed in claim 13, further comprising generating a predetection per transmitted group and per subrow for at least a strongest output signal of the Fourier transformer.

15. The method as claimed in claim 14, further comprising generating a detection if at least P identical predetections are generated for the same subrow from Q consecutively transmitted groups, wherein P=1, 2, . . . , Q=1, 2, . . . , and $P \leq Q$.

* * * * *